April 9, 1929. N. A. NELSON 1,708,798
PORTABLE BORING AND GRINDING MACHINE
Original Filed March 2, 1922    3 Sheets-Sheet 1

Inventor:
Nels A. Nelson,
By Edwin B. H. Towen, Jr.
Atty.

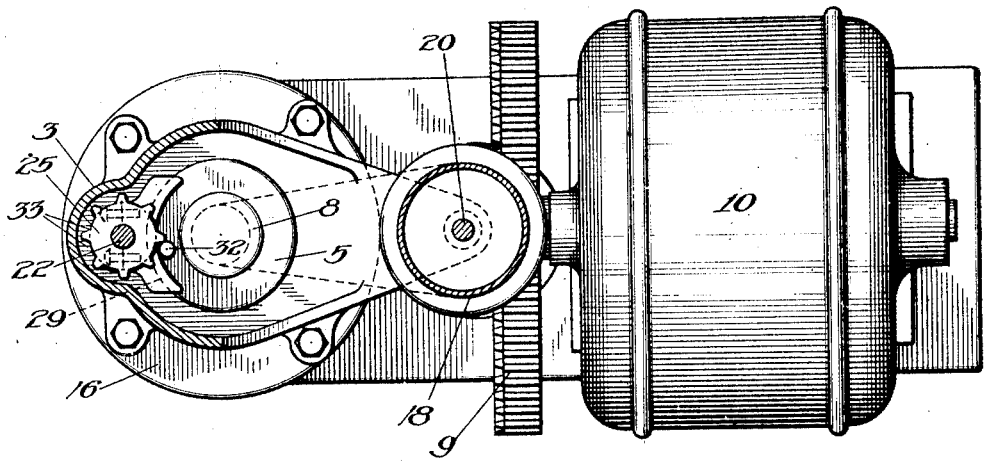
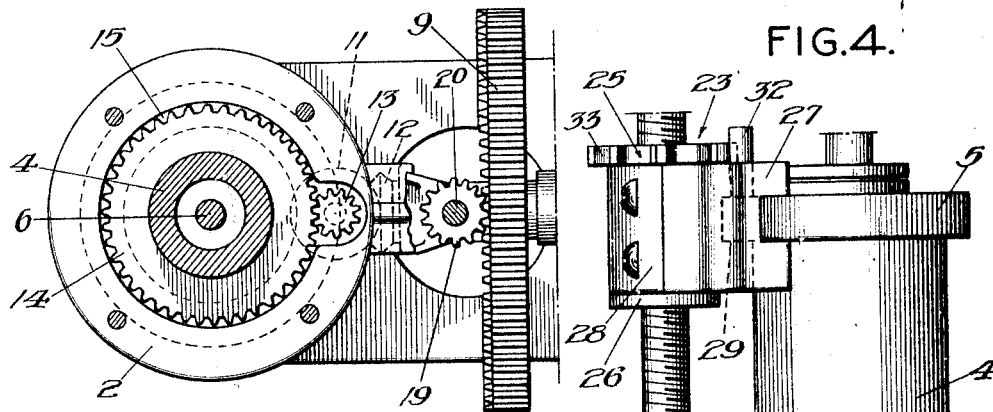
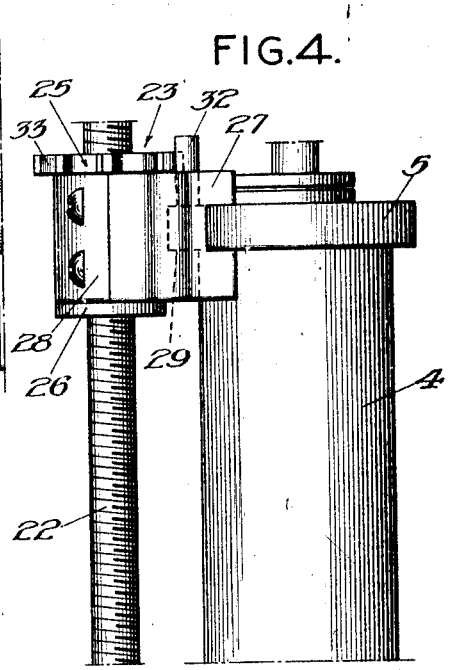
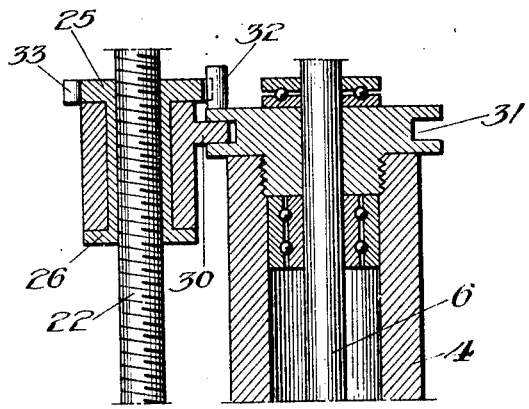

April 9, 1929.    N. A. NELSON    1,708,798
PORTABLE BORING AND GRINDING MACHINE
Original Filed March 2, 1922    3 Sheets-Sheet 3

Inventor:
Nels A. Nelson,
By Edwin B. H. Tower, Jr.
Atty.

Patented Apr. 9, 1929.

1,708,798

UNITED STATES PATENT OFFICE.

NELS A. NELSON, OF PORT WASHINGTON, WISCONSIN, ASSIGNOR, BY MESNE ASSIGNMENTS, TO SIMPLICITY ENGINE & MANUFACTURING COMPANY, OF PORT WASHINGTON, WISCONSIN, A CORPORATION OF WISCONSIN.

PORTABLE BORING AND GRINDING MACHINE.

Application filed March 2, 1922, Serial No. 540,567. Renewed January 31, 1929.

The invention relates to a portable boring and grinding machine.

The boring and grinding machine to which the invention applies in particular has a portable frame for attachment to an engine cylinder, a vertical outer shaft arranged in the frame to rotate and slide therein and adapted to carry a tool, an inner shaft arranged in the outer shaft to drive a tool and to move vertically with the outer shaft, and mechanism to rotate these shafts at different speeds and to move them vertically.

An object of the invention is to provide a compact and efficient machine.

Another object is to provide a machine which is precise in operation.

Another object is to provide a machine which may be readily applied, adjusted and operated.

Another object is to provide a machine which is simple, sturdy and durable.

Another object is to provide a machine which may be readily and economically manufactured.

According to the invention as it is ordinarily embodied, the outer shaft is arranged in a vertical standard, the inner shaft is carried by the outer shaft and driven by a drive which moves along a driver as the inner shaft moves vertically.

The invention further provides feed mechanism which has a feed screw arranged alongside the outer shaft and connected thereto by a shaft carrier to support the outer and inner shafts and to move them vertically.

A machine in which the invention is embodied is shown in the accompanying drawings and the views therein are as follows:

Fig. 2 is a sectional plan view on line 2—2 of Fig. 1.

Fig. 3 is a sectional plan view on line 3—3 of Fig. 1.

Fig. 4 is an elevation of a shaft carrier which supports the tool shafts and moves them vertically.

Fig. 5 is a vertical section of a modified form of shaft carrier.

Figure 1:
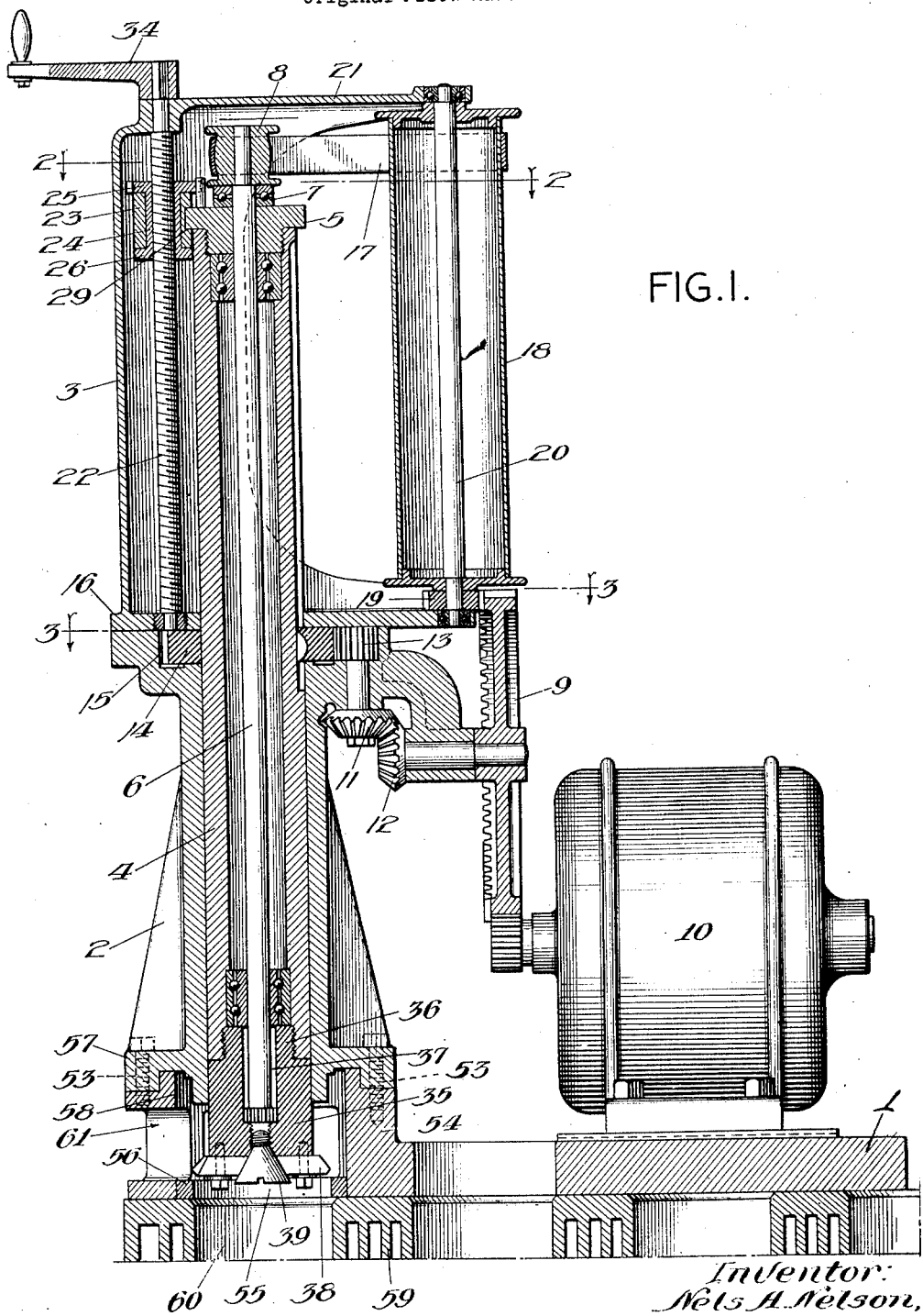
Fig. 1 is a vertical section through the machine showing it in operative position upon a cylinder block.
Figure 6:
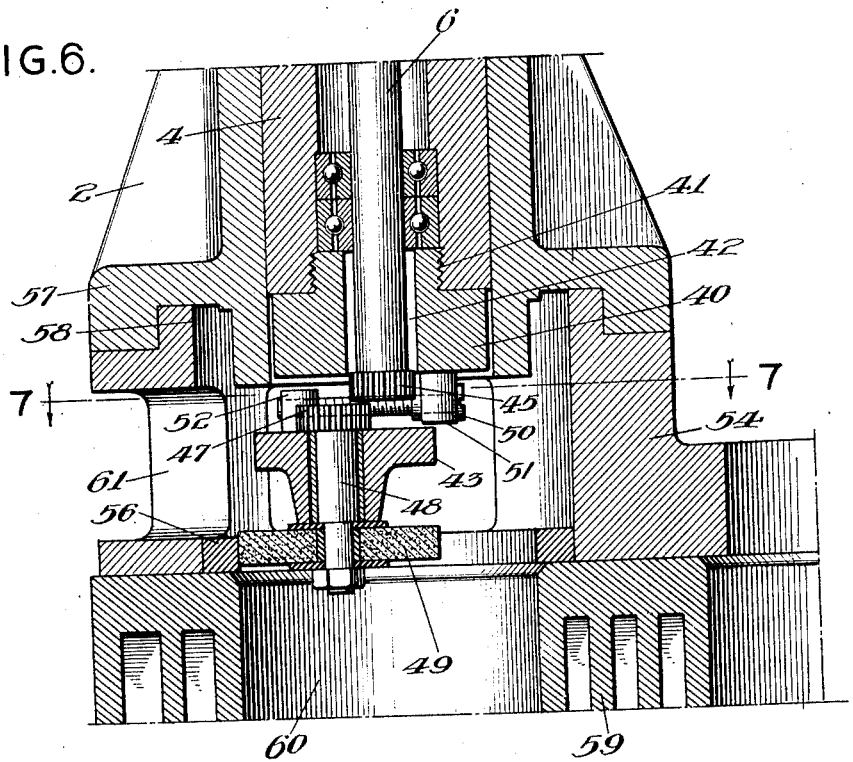
Fig. 6 is a vertical section through the lower part of the machine.
Figure 7:
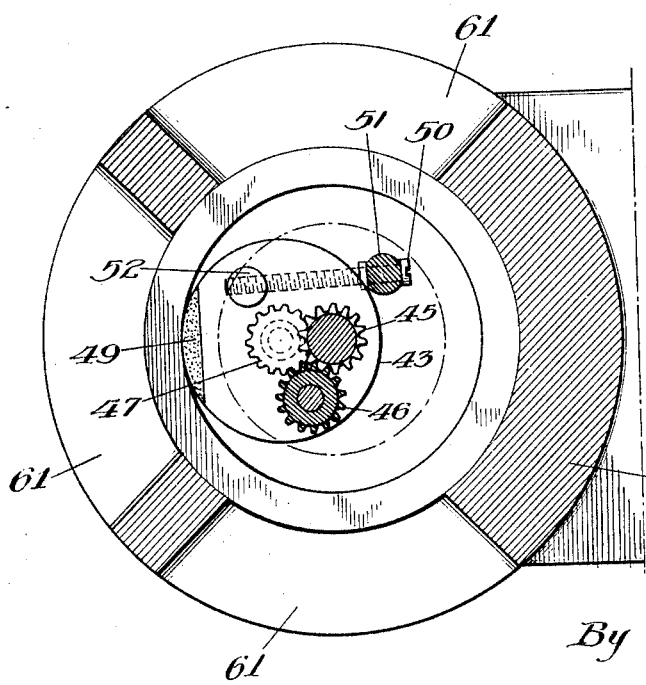
Fig. 7 is a sectional plan view on line 7—7 of Fig. 6.
Figure 8:
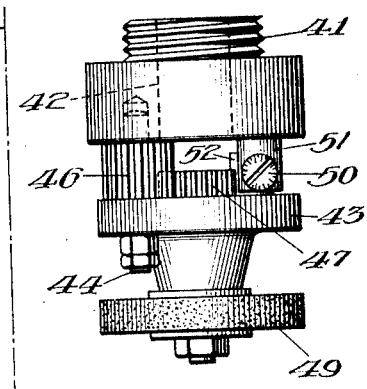
Fig. 8 is a side view of the grinding tool, looking from the right of Fig. 7.

The machine has its mechanism carried by a support or frame having a horizontal base 1 for attachment to an engine cylinder, an upright or vertical standard 2 supported by the base, and an upper frame 3 arranged upon the standard.

A rotatable and slidable outer shaft 4 is journaled in a bearing in the standard and supported therein by a feed mechanism which is arranged in the upper frame and connected to the flanged cap or head 5 of the outer shaft.

An inner shaft 6 is arranged in the outer shaft to rotate independently thereof and is supported by an antifriction bearing 7 which rests upon the head 5 of the outer shaft and supports a pulley 8 secured to the upper end of the inner shaft.

The outer and inner shafts are rotated simultaneously and at different speeds by a driving gear 9 which is driven by a motor 10 arranged upon the base 1.

The driving gear 9 is connected by intermediate bevel pinions 11 and 12 and a spur pinion 13 to a gear 14 which is splined on the outer shaft.

The pinion 13 and the gear 14 are arranged in a recess 15 which is formed in the top of the standard and substantially closed by the base 16 of the upper frame 3 to hold gear 14 against vertical movement and permit the outer shaft to slide therethrough.

The pulley 8 on the inner shaft is connected by a belt 17 to an elongated driving pulley 18 arranged parallel to the outer shaft and rigidly connected to a gear 19 which is rotated by teeth extending laterally from the rim of the gear 9.

The pulley 18 and the gear 19 are carried by a shaft 20 which is journaled in the base 16 and the top 21 of the upper frame 3.

The belt 17 will move along the pulley 18 as the inner shaft moves vertically, and the length of the pulley 18 is approximately equal to the vertical movement of the inner shaft.

The feed mechanism which supports the outer and inner shafts and moves them vertically has a feed screw 22, which is supported in the upper frame alongside the outer shaft, and a shaft carrier 23 which is threaded on the feed screw and connected to the flange of the head 5 by a tongue and groove connection.

The shaft carrier 23 has a feed nut 24 which is threaded on the feed screw and provided with upper and lower flanges 25 and 26 between which a shaft support 27 is carried.

The shaft support 27 has a split bearing 28 in which the nut 24 is journaled and it may have an arcuate groove 29 to receive the flange of the head 5, as shown in Figs. 1, 2 and 4, or an arcuate flange 30 to engage an annular groove 31 in the flange of the head 5, as shown in Fig. 5.

When the machine is in operation, the feed screw remains stationary and the feed nut 24 is rotated in the bearing 28 by one or more pins 32 which are arranged in the head 5 to engage successive teeth 33 formed on the periphery of the upper flange 25.

Rotation of the nut 24 causes it to move along the feed screw and feed the outer and inner shafts downwardly a predetermined distance during each revolution of the outer shaft.

The feed screw 22 is journaled in the base 16 and the top 21 of the upper frame 3 and provided at its upper end with a hand crank 34 by means of which the feed screw may be rotated to raise and lower the shafts manually.

The outer shaft is adapted to carry either a boring tool or a grinding tool and has internal threads at its lower end for this purpose.

The boring tool 35 has a threaded extension 36 for attachment to the lower end of the outer shaft and a bore 37 to accommodate the lower end of the inner shaft which performs no useful function when the boring tool is attached to the machine.

Boring cutters 38 are arranged radially in the lower end of the boring tool and abut the conical head of a screw 39 by means of which they may be adjusted.

The grinding tool has a tool head 40 which is provided with a threaded extension 41 for attachment to the lower end of the outer shaft and a bore 42 to which the lower end of the inner shaft extends to drive the grinding tool when it is attached to the machine.

A bearing 43 is pivoted on and spaced from the tool head 40 by a shouldered stud 44 which is eccentric to the axes thereof.

A pinion 45 is carried by the lower end of the inner shaft 6 to drive an idler gear 46 which is journaled on the stud 44 intermediate the head 40 and the bearing 43.

The idler gear 46 drives a gear 47 arranged on one end of a shaft 48 which is journaled in the bearing 43 and provided at its other end with a grinding wheel 49.

The grinding wheel is adjustable eccentrically of the axis of the tool head by an adjusting screw 50 which is journaled in a lug 51 on the tool head 40 and threaded through a lug 52 on the bearing 43.

The standard 2 is secured by bolts 53 to a vertical flange 54 which is arranged on the base 1 and surrounds a circular opening 55 in which a gauge ring 56 may be placed to facilitate adjustment of the boring and grinding tools.

The base 57 of the standard is counterbored to receive an annular shoulder 58 which is formed on the flange 54 to aline the standard with the opening 55.

If a cylinder is to be both bored and ground, the boring cutters are adjusted to take a cut of the correct diameter and the machine secured to the cylinder block 59 with the outer shaft 4 concentric with the cylinder 60 which is to be bored.

The hand crank 34 is operated to lower the boring tool to the top of the cylinder and the motor started, which will cause the outer shaft to rotate the boring tool and the feed mechanism to advance the tool slowly through the cylinder.

When the cylinder has been bored, the standard is removed from the base, the grinding tool substituted for the boring tool, and the standard replaced.

The grinding wheel is preferably adjusted after the standard is secured to the base and lateral openings 61 are formed in the flange 54 to permit access to the grinding tool.

The outer shaft 4 will revolve the grinding tool at a relatively slow speed to carry the grinding wheel around the wall of the cylinder, the inner shaft 6 will rotate the grinding wheel at a relatively high speed, and the feed mechanism will advance the tool through the cylinder.

The machine herein set forth may be modified in various ways without departing from the invention embodied therein and hereafter claimed.

The invention is claimed as follows:

1. A boring and grinding machine comprising a portable frame having a horizontal base and a vertical standard, a rotatable and slidable outer shaft arranged in said standard, a drive to rotate said outer shaft, an inner shaft arranged in said outer shaft to drive a tool and carried by said outer shaft, a rotary driver arranged alongside said outer shaft, a drive connecting said inner shaft and said driver and movable with said inner shaft along said driver, and means to move said shafts vertically.

2. A boring and grinding machine comprising a portable frame having a horizontal base and a vertical standard, a rotatable and slidable outer shaft arranged in said standard and adapted to carry either a boring tool or a grinding tool at its lower end, a drive to rotate said outer shaft, an inner shaft arranged in said outer shaft to drive a grinding tool and carried by said outer shaft, a rotary driver arranged alongside said outer shaft, a drive connecting said inner shaft and said driver and movable with said inner shaft along said driver, and means to move said shafts vertically.

3. A boring and grinding machine comprising a portable frame having a horizontal base and a vertical standard, a rotatable and slidable outer shaft arranged in said standard, a drive connected to said outer shaft and having said outer shaft slidable relatively thereto, an inner shaft arranged in said outer shaft to drive a tool and carried by said outer shaft, a rotary driver arranged alongside said outer shaft, a drive connecting said inner shaft and said driver and movable with said inner shaft along said driver, and means to move said shafts vertically.

4. A boring and grinding machine comprising a portable frame having a horizontal base and a vertical standard, a rotatable and slidable outer shaft arranged in said standard, a gear splined on said outer shaft and held against vertical movement by said frame, means to rotate said gear, an inner shaft arranged in said outer shaft to drive a tool and carried by said outer shaft, a rotary driver arranged alongside said outer shaft, a drive connecting said inner shaft and said driver and movable with said inner shaft along said driver, and means to move said shafts vertically.

5. A boring and grinding machine comprising a portable frame having a horizontal base and a vertical standard, a rotatable and slidable outer shaft arranged in said standard and adapted to carry either a boring tool or a grinding tool at its lower end, a gear splined on said outer shaft and held against vertical movement by said frame, means to rotate said gear, an inner shaft arranged in said outer shaft to drive a tool and carried by said outer shaft, a rotary driver arranged alongside said outer shaft, a drive connecting said inner shaft and said driver and movable with said inner shaft along said driver, and means to move said shafts vertically.

6. A boring and grinding machine comprising a portable frame having a horizontal base and a vertical standard, a rotatable and slidable outer shaft arranged in said standard, a gear splined on said outer shaft and held against vertical movement by said frame, a motor carried by said frame and connected to said gear to drive the same, an inner shaft arranged in said outer shaft to drive a tool and carried by said outer shaft, a rotary driver arranged alongside said outer shaft and driven by said motor, a drive connecting said inner shaft and said driver and movable with said inner shaft along said driver, and means to move said shafts vertically.

7. A boring and grinding machine comprising a portable frame having a horizontal base and a vertical standard, a rotatable and slidable outer shaft arranged in said standard, a drive to rotate said outer shaft, an inner shaft arranged in said outer shaft to drive a tool and carried by said outer shaft, a rotary driver arranged alongside said outer shaft, a drive connecting said inner shaft and said driver and movable with said inner shaft along said driver, a feed screw arranged alongside said outer shaft, a shaft carrier threaded on said feed screw and connected to said outer shaft to support the same, and means to move said shaft carrier along said feed screw and move said shafts vertically.

8. A boring and grinding machine comprising a portable frame having a horizontal base and a vertical standard, a rotatable and slidable outer shaft arranged in said standard, a drive to rotate said outer shaft, an inner shaft arranged in said outer shaft to drive a tool and carried by said outer shaft, a rotary driver arranged alongside said outer shaft, a drive connecting said inner shaft and said driver and movable with said inner shaft along said driver, a feed screw arranged alongside said outer shaft, a shaft carrier threaded on said feed screw and connected to said outer shaft to support the same, means to move said shaft carrier automatically along said feed screw to move said shafts vertically, and a hand crank on said feed screw to rotate the same and raise or lower said shafts manually.

9. A boring and grinding machine comprising a portable frame having a horizontal base and a vertical standard, a rotatable and slidable outer shaft arranged in said standard, a drive to rotate said outer shaft, an inner shaft arranged in said outer shaft to drive a tool and carried by said outer shaft, a rotary driver arranged alongside said outer shaft, a drive connecting said inner shaft and said driver and movable with said inner shaft along said driver, a feed screw arranged alongside said outer shaft, a shaft carrier threaded on said feed screw and having a tongue and groove connection with said outer shaft to support the same, and means to move said shaft carrier along said feed screw and move said shafts vertically.

10. A boring and grinding machine comprising a tubular outer shaft having independent rotary and axial movements, a rotary inner shaft carried in said outer shaft to drive a tool, a rotary driver arranged parallel to said outer shaft, an inner shaft drive connecting said inner shaft and said driver and movable with said inner shaft along said driver, and means operated by said outer shaft to move said shafts axially.

11. A boring and grinding machine comprising a tubular outer shaft having independent rotary and axial movements and adapted to carry either a boring tool or a grinding tool, a rotary inner shaft carried in said outer shaft to drive a tool, a rotary driver arranged parallel to said outer shaft, an inner shaft drive connecting said inner shaft and said driver and movable with said inner shaft along said driver, and means operated by said outer shaft to move said shafts axially.

12. A metal working machine comprising a vertical outer shaft having independent rotary and axial movements, a drive to rotate said outer shaft arranged intermediate the ends thereof and held against vertical movement, an independently rotatable inner shaft carried in said outer shaft to drive a tool, a rotary driver arranged parallel to said outer shaft, a drive connecting said inner shaft and said driver and movable with said inner shaft along said driver, and means arranged alongside of and operated by said outer shaft to move said shafts vertically.

13. A portable metal working machine comprising a vertical outer shaft having independent rotary and axial movements, a drive to rotate said outer shaft, an independently rotatable inner shaft carried in said outer shaft to drive a tool, a rotary driver arranged parallel to said outer shaft, a drive connecting said inner shaft and said driver and movable with said inner shaft along said driver, a feed screw arranged alongside said outer shaft, a shaft carrier threaded on said feed screw and connected to said outer shaft to support the same, and means operated by said outer shaft to move said shaft support along said feed screw and move said shafts vertically.

14. A metal working machine comprising a vertical outer shaft having independent rotary and axial movements and adapted to carry a tool, a drive to rotate said outer shaft, an independently rotatable inner shaft carried in said outer shaft to drive a tool, a rotary driver arranged parallel to said outer shaft, a drive connecting said inner shaft and said driver and movable with said inner shaft along said driver, a feed screw arranged alongside said outer shaft, a shaft carrier threaded on said feed screw and having a tongue and groove connection with said outer shaft to support the same, and means to move said shaft carrier along said feed screw and move said shafts vertically.

15. A boring and grinding machine comprising a portable frame having a horizontal base and a vertical standard, a rotatable and slidable outer shaft arranged in said standard, a drive to rotate said outer shaft, an inner shaft arranged in said outer shaft to drive a tool and carried by said outer shaft, a rotary driver arranged alongside said outer shaft, a drive connecting said inner shaft and said driver and movable with said inner shaft along said driver, and means operated by said outer shaft to move said shafts vertically.

16. A boring and grinding machine comprising a portable frame having a horizontal base and a vertical standard, a rotatable and slidable outer shaft arranged in said standard, a gear splined on said outer shaft and held against vertical movement by said frame, means to rotate said gear, an inner shaft arranged in said outer shaft to drive a tool and carried by said outer shaft, a rotary driver arranged alongside said outer shaft, a drive connecting said inner shaft and said driver and movable with said inner shaft along said driver, and means operated by said outer shaft to move said shafts vertically.

17. A boring and grinding machine comprising a portable frame having a horizontal base and a vertical standard, a rotatable and slidable outer shaft arranged in said standard, a drive to rotate said outer shaft, an inner shaft arranged in said outer shaft to drive a tool and carried by said outer shaft, a rotary driver arranged alongside said outer shaft, a drive connecting said inner shaft and said driver and movable with said inner shaft along said driver, a feed screw arranged alongside said outer shaft, a feed nut threaded on said feed screw, a shaft support carried by said nut and connected to said outer shaft to support the same, and means to rotate said nut and move the same along said feed screw to feed said outer shaft downwardly.

18. A boring and grinding machine comprising a portable frame having a horizontal base and a vertical standard, a rotatable and slidable outer shaft arranged in said standard, a drive to rotate said outer shaft, an inner shaft arranged in said outer shaft to drive a tool and carried by said outer shaft, a rotary driver arranged alongside said outer shaft, a drive connecting said inner shaft and said driver and movable with said inner shaft along said driver, a feed screw arranged alongside said outer shaft, a feed nut threaded on said feed screw, a shaft support carried by said nut and connected to said outer shaft to support the same, and means operated by said outer shaft to rotate said nut and move the same along said feed screw to feed said outer shaft downwardly.

19. A boring and grinding machine comprising a portable frame having a horizontal base and a vertical standard, a rotatable and slidable outer shaft arranged in said standard, a drive to rotate said outer shaft, an inner shaft arranged in said outer shaft to drive a tool and carried by said outer shaft, a rotary driver arranged alongside said outer shaft, a drive connecting said inner shaft and said driver and movable with said inner shaft along said driver, a feed screw arranged alongside said outer shaft, a feed nut threaded on said feed screw, a shaft support carried by said nut and connected to said outer shaft to support the same, a toothed wheel arranged on said nut, and a pin carried by said outer shaft to engage successive teeth of said wheel and rotate the same as the outer shaft rotates to feed said outer shaft downwardly.

20. A boring and grinding machine comprising a portable frame having a horizontal base and a vertical standard, a rotatable and slidable outer shaft arranged in said standard and adapted to carry a tool, a drive to rotate said outer shaft, an inner shaft arranged in said outer shaft to drive a tool and carried by said outer shaft, a rotary driver arranged alongside said outer shaft, a drive connecting said inner shaft and said driver and movable with said inner shaft along said driver, a feed screw arranged alongside said outer shaft, a feed nut threaded on said feed screw, a shaft support journaled on said nut and having a tongue and groove connection with said outer shaft to support the same, a toothed wheel arranged on said nut, and a pin carried by said outer shaft to engage successive teeth of said wheel and rotate the same as the outer shaft rotates to feed said outer shaft downwardly.

In witness whereof, I have hereunto subscribed my name.

NELS A. NELSON.